UNITED STATES PATENT OFFICE.

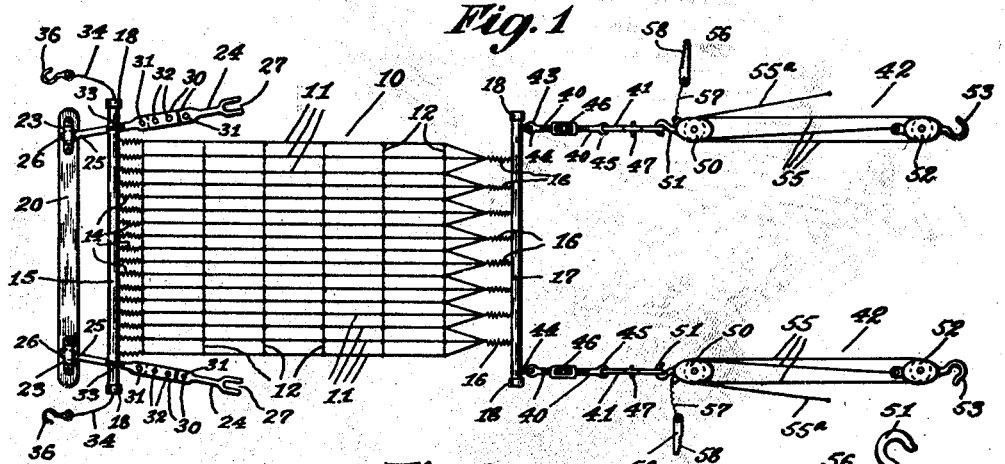

DOUGLAS D. HAMILTON, OF SEATTLE, WASHINGTON.

AUTO-BED.

1,356,141.   Specification of Letters Patent.   Patented Oct. 19, 1920.

Application filed March 1, 1920. Serial No. 362,623.

*To all whom it may concern:*

Be it known that I, DOUGLAS D. HAMILTON, a citizen of the United States, residing at Seattle, in the county of King and State of Washington, have invented a certain new and useful Improvement in Auto-Beds, of which the following is a specification.

My invention relates to improvements in portable folding beds for motor vehicles and the object of my invention is to provide a bed that is adapted to be longitudinally disposed within and suspended from the upper portions of the said vehicle.

Another object of my invention is to provide an adjustable portable folding bed embodying novel suspension and adjusting means adapting it for use with any of the well known types of motor vehicles.

A further object of my invention is to provide an adjustable portable folding bed for motor vehicles which when not in use may be folded into a very compact form, and which when unfolded may be quickly and easily attached to the said vehicle to provide a full sized bed and which may be detached from the vehicle with equal facility.

A still further object of my invention is to provide an adjustable portable folding bed for motor vehicles which combines strength and durability with economy of weight, embodying simplicity and economy in construction and that will not readily get out of order.

With the above and other objects in view which will appear as the description proceeds, my invention resides in the novel construction, combination, adaptation and arrangement of parts hereinafter described and claimed.

I accomplish these objects by devices illustrated in the accompanying drawings, wherein:—

Figure 1 is a top plan view of a bed and its associated mechanism constructed in accordance with the principles of my invention.

Fig. 2 is a view in side elevation of the same as it may appear when attached to a motor vehicle.

Fig. 3 is a fragmentary view in perspective illustrating one of the adjustable supporting mechanisms for the head of the bed.

Fig. 4 is a fragmentary view in perspective illustrating one of the adjustable suspension mechanisms for the foot of the bed.

Figs. 5 and 6 are views of details of my invention, and, Fig. 7 is a fragmentary view in side elevation of a modified form of suspension mechanism for the foot end of the bed.

Referring to the drawings, throughout which like reference numerals indicate like parts, the numeral 10 indicates the mattress support of my adjustable portable folding bed comprising a plurality of longitudinally disposed tension wires 11 spaced at intervals from side to side of the said support, a plurality of connecting or reinforcing transversely disposed wires 12 for the said tension wires spaced at intervals from end to end of the said mattress support, a plurality of helical tension springs 14 disposed in prolongation to the said tension wires 11 and adapted to connect the said mattress support to a transverse hollow or tubular rod 15 disposed at the head end of the bed and a plurality of similar helical tension springs 16 disposed in prolongation to alternate tension wires 11 and adapted to connect the said mattress support to a transverse hollow or tubular rod 17 disposed at the foot end of the said bed. The ends of the aforesaid rods 15 and 17 are preferably provided with caps or closures 18 threadably engaged thereon.

The supporting mechanism for the head end of the bed comprises a rectangular board 20, a plurality of sockets 23 integral with or otherwise fixedly secured to the upper surface of and adjacent to the ends of the said board, and a plurality of adjustable supporting rods or bars 24.

The rectangular board 20 is preferably made of wood or other suitable material and is adapted when positioned to extend transversely of the vehicle 21, to rest on the upper portion 22 of the cushion of the rear seat of the said vehicle when so positioned as shown more clearly in Fig. 2.

The sockets 23 as now constructed are preferably formed from metallic strips or bars cut and bent to the desired shape as shown in the drawings and are fixedly secured to the upper surface of the board 20 adjacent the ends thereof in any well known manner. The said sockets 23 are adapted to receive and restrainingly engage the rear ends of the supporting rods 24 when the latter are positioned.

The adjustable supporting rods 24 are disposed at each side of the vehicle and have their rear ends bent downwardly and rearwardly at 25 and flattened at 26 to seat or be restrainingly engaged in the sockets 23, the forward ends of the rods 24 are bifurcated at 27 to straddle the lower ends of the bow member 28 of the vehicle top 29 when the said rods are positioned. The rods 24 are preferably formed in halves as shown, the contiguous ends 30 of the said halves are flattened and are provided with a plurality of holes 31 adapted to receive pins or bolts 32 which serve to clamp or rigidly secure the said halves together and which also provides for readily increasing or decreasing the lengths of the rods 24 as desired. The rear halves of the rods 24 are further provided on their upper sides and substantially midway of their lengths with hooks 33 adapted to receive and restrainingly engage the hollow or tubular rod 15 disposed at the head end of the bed when the latter is positioned as shown in the drawings.

To further secure the head end of the bed in its position and to prevent sidewise movement of the same and also to partially relieve the strain on the hooks 33, I have provided flexible cords 34 the forward ends of which pass through central holes 19 in the caps 18 and are disposed within the hollow or tubular rod 15. The said forward ends have knots 35 formed thereon which are adapted to normally bear against the inner sides of the caps 18 as shown more clearly in Fig. 6. The rear ends of the cords 34 are provided with hooks 36 that are adapted to engage the studs 37 of the vehicle top supporting brackets 38 when the mechanism is assembled as shown more clearly in Fig. 2. It will be obvious from the foregoing that this construction provides for readily increasing or decreasing the lengths of the cords 34 when desired.

The supporting or suspension mechanism for the foot end of the bed comprises adjustable tension rods 40, equalizing triangular members 41 and blocks with their associated tackle 42.

The adjustable tension rods 40 as now constructed are formed on their rear ends with eyes or loops 43, the said eyes or loops being adapted to engage hooks 44 integral with or otherwise fixedly secured to the side and on the ends of the hollow or tubular rod 17. The forward ends of the said rods 40 are also formed with eyes 45 adapted to be positively connected to the lower rear corners of the triangular members 41. The adjustable tension rods 40 are preferably formed in halves having their contiguous ends threadably engaged by turn buckles 46 as more clearly shown in Fig. 4.

The equalizing triangular members 41 are preferably formed in the shape of isosceles triangles and are provided on their vertexes thereof with hooks 47 positively connected thereto. The hooks 47 are adapted to engage pins 48 in the upper corners of the wind shield 49 of the vehicle to thus suspend the triangular members 41 on each side of the said windshield as shown in Figs. 1 and 2.

The blocks and their associated tackle 42 comprise double pulley blocks 50 having hooks 51 adapted to engage the lower forward corners of the equalizing triangular members 41, single pulley blocks 52 having hooks 53 on their forward ends adapted to engage the lamp brackets 54 or the bumper or other fixed part of the vehicle, the blocks 50 and 52 are connected by ropes or light cables 55 in any well known manner.

To lock or positively retain the free ends 55$^a$ of the ropes 55 to the blocks 50 when the bed is positioned and the desired tension has been obtained, I have provided the said blocks with wedge members 56 which are flexibly connected to the same by cords 57. The wedge members 56 are provided with serrated edges 58 adapted to engage the free ends 55$^a$ of the ropes or cables 55 passing over the pulleys in the blocks 50 when the said members are inserted therein as shown in Fig. 5.

In Fig. 7 I have shown a modified form of a supporting or suspension mechanism for the foot end of the bed this form being better suited for some types of motor vehicles than my preferred form. In this construction the equalizing triangular members 60 are formed substantially in the shape of scalene triangles, the said members being disposed on each side and suspended by their vertexes from studs 61 or other protuberances on the sides of the wind shield 49 of the vehicle. The hollow or tubular rod 17 at the foot end of the bed is disposed directly in the lower rear corners of the said members while the hooks 51 of the pulley blocks 50 engage the lower front corners of the said members in a similar manner to that described above for the preferred construction.

I have found in practice and after exhaustive experimentation that in order to eliminate or reduce the transverse strains and stresses on the wind shield 49 and to provide a supporting or suspension mechanism for the foot end of the bed wherein all the strain on the latter will be in tension or in a substantially longitudinal direction when the load is on the said bed that the equalizing triangular members 41 or 60 with their associated tackle combined to give the best and desired results. The load or weight on the windshield being in substantially a vertical downward direction which does not affect the rigidity of the latter as will be readily understood.

It is thought that the method of assembling or erecting the respective elements comprising my bed in their proper and logical order, and conversely, the collapsing and storing of the said elements within a small compass is clear and obvious from the foregoing description taken in connection with the several views of the drawings. When the elements are first assembled the bed is substantially in the position shown by the dotted lines in Fig. 2, the proper tension being applied by manipulating the blocks and tackle 42 to thereby bring the bed substantially to the position shown in the full lines of the aforesaid figure.

The bed as now constructed is made of a sufficiently large size so that two persons may occupy the same with the maximum of comfort. I have also provided a suitable mattress not shown specially adapted for use with a bed of this type in which I wrap the several elements comprising the bed when the same are not in use, thus providing a convenient and compact means for the storing and transporting of the same on a motor vehicle.

From the foregoing description taken in connection with the accompanying drawings, the advantages of the construction and of the method of operation will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the invention.

What I claim is:—

1. In combination with a motor vehicle of an adjustable portable bed adapted to be disposed therein comprising a mattress support, transverse rods disposed at each end of the said support, helical tension springs connecting the said rods to the said support, supporting rods disposed at the rear end, and restrainingly engaged to the sides of the said vehicle, means carried by the said rods adapted to restrainingly engage the transverse rod at the head end of the said mattress support, triangular equalizing members adapted to be suspended from the upper portion of the said vehicle, means carried by the said members adapted to restrainingly engage the transverse rod at the foot end of the said mattress support and tension means carried by the said members adapted to regulate the tension of the said mattress support.

2. In combination with a motor vehicle of an adjustable portable bed adapted to be disposed longitudinally therein comprising a mattress support, transversely disposed rods at each end of the said support, helical tension springs connecting the said rods to the said mattress support, a transversely disposed board at the rear end and upper portion of the said vehicle, supporting rods disposed at the rear end and on the sides of the said vehicle, means on the rear ends of the said rods adapted to restrainingly engage means on the said board, means on the forward ends of the said rods adapted to restrainingly engage fixed means on the sides of the said vehicle, means carried by the said rods adapted to restrainingly engage the transverse rod at the head end of the said mattress support, retaining means carried by the said transverse rod adapted to engage fixed means on the sides of the said vehicle, triangular equalizing members adapted to be suspended from the upper portion of the said vehicle, rods connecting the said members to the transverse rod at the foot end of the said mattress support and tension means carried by the said members adapted to engage fixed means on the said vehicle to regulate the tension on the said mattress support.

3. In combination with a motor vehicle of an adjustable portable bed adapted for suspension and longitudinal disposition therein comprising a mattress support, transversely disposed rods at the head and foot ends of the said support, helical tension springs connecting the said rods to the said mattress support, a transversely disposed board at the rear end and upper portion of the said vehicle, adjustable supporting rods disposed at the rear end and on the sides of the said vehicle, means on the rear ends of the said rods adapted to restrainingly engage means carried by the said board, means on the forward ends of the said rods adapted to restrainingly engage fixed means on the sides of the said vehicle, hooks carried by the said rods adapted to restrainingly engage the transverse rod at the head end of the aforesaid mattress support, retaining means carried by the said transverse rod adapted to engage fixed means on the sides of the said vehicle, triangular equalizing members, suspension hooks carried by the said members adaptable for suspending the latter from the windshield of the said vehicle, adjustable rods connecting the said members to the transverse rod at the foot end of the said mattress support and tension means carried by the said members adapted to engage fixed means on the said vehicle to regulate the tension on the said mattress support.

4. In combination with a portable bed for a motor vehicle of a supporting mechanism comprising a board disposed transversely of and on the rear end and upper portion of the said vehicle, adjustable supporting rods disposed at the rear end and on the sides of the said vehicle, means on the rear ends of the said rods adapted to restrainingly engage means carried by the said board, means on the forward ends of the said rods adapted to restrainingly engage fixed means on the sides of the said vehicle and hooks carried by the said rods adapted to restrainingly engage the end portion of the said bed.

5. In combination with a portable bed for a motor vehicle of a suspension mechanism comprising triangular equalizing members, suspension hooks carried by the said members adapted to suspend the latter from the windshield of the said vehicle, adjustable rods connecting the said members to the end portion of the said bed and tension means carried by the said members adapted to engage fixed means on the said vehicle to regulate the tension on the said bed.

In witness whereof, I hereunto subscribe my name this 24th day of February, A. D. 1920.

DOUGLAS D. HAMILTON.